US012579897B2

(12) United States Patent　(10) Patent No.: US 12,579,897 B2
Mujumdar et al.　(45) Date of Patent: Mar. 17, 2026

(54) MOBILE DEVICE AND METHODS FOR TRAVELLING TOWARDS A DESTINATION USING A COMMUNICATION NETWORK

(71) Applicant: Telefonaktiebolaget LM Ericsson (publ), Stockholm (SE)

(72) Inventors: Anusha Pradeep Mujumdar, Bangalore (IN); Ganapathy Raman Madanagopal, Bengaluru (IN); Swarup Kumar Mohalik, Bangalore Karnataka (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 338 days.

(21) Appl. No.: 17/630,029

(22) PCT Filed: Jan. 27, 2020

(86) PCT No.: PCT/IN2020/050087
§ 371 (c)(1),
(2) Date: Jan. 25, 2022

(87) PCT Pub. No.: WO2021/019549
PCT Pub. Date: Feb. 4, 2021

(65) Prior Publication Data
US 2022/0284822 A1　Sep. 8, 2022

(30) Foreign Application Priority Data
Jul. 26, 2019　(IN) .............................. 201911030345

(51) Int. Cl.
*G08G 5/00*　(2025.01)
*G01C 21/00*　(2006.01)
(Continued)

(52) U.S. Cl.
CPC ................. *G08G 5/34* (2025.01); *G08G 5/26* (2025.01); *G08G 5/55* (2025.01); *G08G 5/57* (2025.01);
(Continued)

(58) Field of Classification Search
None
See application file for complete search history.

(56) References Cited

U.S. PATENT DOCUMENTS 6,377,875 B1 * 4/2002 Schwaerzler ........ G05D 1/0022
340/853.2
9,858,824 B1 　1/2018 Zogg et al.
(Continued)

FOREIGN PATENT DOCUMENTS

WO　WO 2018/125686 A2　7/2018

OTHER PUBLICATIONS

Search Report, European Patent Application No. 20846441.2, mailed Jul. 25, 2023, 10 pages.
(Continued)

*Primary Examiner* — Jess Whittington
*Assistant Examiner* — Rami Nabih Bedewi
(74) *Attorney, Agent, or Firm* — Sage Patent Group

(57) ABSTRACT

A mobile device for travelling to a destination using a communication network is provided. The mobile device obtains from one or more network nodes in the communication network, a first path over a first sub-region of a region, comprising one or more sub-regions, towards the destination. The mobile device further follows the first path; and upon entering, or being in, a second sub-region of the region having a level of connectivity below a threshold, switches to follow a second path calculated locally at the mobile device.

19 Claims, 9 Drawing Sheets

(51) Int. Cl.

| | |
|---|---|
| *G01C 21/34* | (2006.01) |
| *G08G 5/04* | (2006.01) |
| *G08G 5/22* | (2025.01) |
| *G08G 5/26* | (2025.01) |
| *G08G 5/32* | (2025.01) |
| *G08G 5/34* | (2025.01) |
| *G08G 5/55* | (2025.01) |
| *G08G 5/57* | (2025.01) |
| *G08G 5/59* | (2025.01) |
| *G08G 5/80* | (2025.01) |
| *H04B 7/185* | (2006.01) |
| *H04W 36/30* | (2009.01) |
| *H04W 36/32* | (2009.01) |

(52) U.S. Cl.
CPC ................. *G08G 5/59* (2025.01); *G08G 5/80* (2025.01); *H04W 36/305* (2018.08); *H04W 36/322* (2023.05)

(56) References Cited

U.S. PATENT DOCUMENTS

| | | | |
|---|---|---|---|
| 2016/0101876 A1* | 4/2016 | Wolfe | .................... B64D 45/00 |
| | | | 701/31.4 |
| 2016/0102988 A1 | 4/2016 | Kalai et al. | |
| 2016/0328980 A1* | 11/2016 | Sharma | .................... G08G 5/26 |
| 2018/0017973 A1* | 1/2018 | Teague | ................. G05D 1/0088 |
| 2019/0364492 A1* | 11/2019 | Azizi | ................ H04W 52/0264 |
| 2020/0166351 A1* | 5/2020 | Iijima | ................. G05D 1/0088 |

OTHER PUBLICATIONS

International Search Report and Written Opinion of the International Searching Authority, PCT/IN2020/050087, mailed Jun. 1, 2020, 8 pages.

Karaman, S., et al., "Sampling-based Algorithms for Optional Motion Planning," Computer Science, Mathematics, Engineering, The International Journal of Robotics Research, May 5, 2011, 76 pages.

Stastny, T., et al., "Nonlinear MPC for Fixed-wing UAV Trajectory Tracking: Implementation and Flight Experiments," Conference paper, American Institute of Aeronautics and Astronautics, 2017, https://doi.org/10.3929/ethz-a-010819607 15 pages.

Padhi, R., "Evolving Philosophies on Autonomous Obstacle/ Collision Avoidance of UAVs," AIAA Journal of Aerospace Computing, Information and Communication, vol. 8, Feb. 2011, 26 pages.

Skarin, P., et al., "Towards Mission-Critical Control at the Edge and Over 5G," 2018 IEEE International Conference on Edge Computing (EDGE), Jul. 2-7, 2018, San Francisco, CA, USA, 8 pages.

* cited by examiner

MOBILE DEVICE AND METHODS FOR TRAVELLING TOWARDS A DESTINATION USING A COMMUNICATION NETWORK

CROSS REFERENCE TO RELATED APPLICATIONS

This application is a 35 U.S.C. § 371 national stage application of PCT International Application No. PCT/IN2020/050087 filed on Jan. 27, 2020, which in turn claims foreign priority to Indian Patent Application number 201911030345, filed on Jul. 26, 2019, the disclosures and content of which are incorporated by reference herein in their entirety.

TECHNICAL FIELD

Embodiments herein relate to a method and mobile device in a communications network. In particular, embodiments herein relate to travelling towards a destination using the communications network.

BACKGROUND

Path planning is a critical enabling technology for mobile devices to be truly autonomous. Mobile devices, when used herein, include mobile agents, vehicles, aerial vehicles and similar. Mobile device path planning can be done in various ways taking into account constraints in the 3D-space and known obstacles. Such algorithms take a spatial map along with obstacle maps as input, which can be very large in size, and therefore is typically compute intensive.

Therefore, path planning may be done globally for a given mission, with a given initial and goal state and a representation of the environment. Because of the compute intensive nature of such algorithms, path planning is usually done offline prior to flight, in the Cloud (and not in the mobile device). The paths thus found are collision-free with regards to known obstacles which are known a priori, such as buildings, trees etc.

However, during travel or flight, dynamic restricted zones, no-fly zones or dynamic obstacles may arise. Such scenarios require re-planning of the path or planning a new path. The cloud-based path planning may not be accessible if the mobile device faces such hazards in zones with low connectivity or no connectivity, since there would be no way of communicating data of the obstacles to the mobile device and/or for the mobile device to get guidance about re-planned waypoints.

Since mobile device path planning must consider zones or areas with different connectivity qualities, it is essential to have a path planning system that ensures a path for the mobile device at any point of its flight, regardless of unforeseen obstacles.

Path planners, in the most basic sense, may first build an environment perception, such as a map, graph or tree of all feasible branches. In deterministic methods, the map is primarily built in a systematic, exhaustive way. In sampling-based methods, the map is built by sampling randomly and adding the samples to the map if reachable, i.e. if the path is collision-free.

Once the map is built, the second step is to query the map with a given initial state and a given goal state, i.e. a present location and a destination location. The path is found by a search to find a possible path, also referred to as a feasible path, if it exists. This path is input to the mobile device, and the mobile device follows the path using its automatic controlling system, such as an autopilot, and on-board controllers. Thus, it is generally considered that the process of providing autonomy occurs in the cloud, while the execution control at the mobile device is non-autonomous and only follows the path that is given to the mobile device.

SUMMARY

As a part of developing embodiments herein, the inventors identified a problem which will first be discussed.

As mentioned above, in current solutions, path planning is done globally. The global planning is then followed by local path-following control. This assumes access to complete information at the time of planning, and very little deviation in the environment at the time of travel. Some solutions propose local control via communication with the cloud, which assumes perfect connectivity. However, assuming perfect connectivity may not be realistic, particularly in safety-critical applications such as mobile device flight applications.

When mobile device paths must pass through zones with different degrees of connectivity, one way to handle unexpected obstacles in a zone with insufficient connectivity is to trace back to a previous zone with adequate connectivity, communicate the observed obstacle details, such as position and extent, to the cloud and obtain a new path. However, this may not be a good solution for energy-constrained mobile devices.

One way to ensure availability of paths at all time is by letting the mobile device have the entire map of a region in its memory and let the mobile device compute a new path, i.e. perform re-planning, in cases of unexpected obstacles, thus taking over path planning locally in case of insufficient connectivity. However, this is not feasible in most cases, due to severe constraints on memory and compute cycles in the mobile devices, to be dedicated for re-planning. The required data may e.g. occupy hundreds of MBs or GBs in the memory of a mobile device. Such a large input data occupancy may, furthermore, not be feasible since a large part of the memory typically needs to be dedicated for a task to be performed by the mobile device, such as recording a video feed.

Storing the entire environment graph or roadmap onboard a mobile device is thus not preferred. In a typical case, only the planned path is stored on board, and a control loop may be closed via a controller in the cloud. Such schemes may however be highly problematic, especially in cases where: a true environment deviates from the planned environment, e.g. if a new obstacle exists then a new path plan is required, the mobile device may lose connectivity, and may therefore only rely on its own knowledge of the path; and where the mobile device encounters a changed environment and loses connectivity with the cloud. In the latter scenario, dangerous situations may occur, leading to a mobile device with no means to achieve its mission, which may potentially lead to loss of life or property. Such an event may be referred to as a deadlock.

An object of embodiments herein is, therefore, to improve the performance of a mobile device travelling towards a destination using a communication network.

According to an aspect of embodiments herein, the object is achieved by a method performed by a mobile device such as an aerial vehicle for travelling towards a destination using a communication network. The mobile device obtains from one or more network nodes in the communication network, a first path over a first sub-region of a region towards the destination. The mobile device further follows the first path;

and upon entering, or being in, a second sub-region of the region having a level of connectivity below a threshold, the mobile device switches to follow a second path calculated locally at the mobile device.

According to a further aspect of embodiments herein, the object is achieved by providing a mobile device for travelling towards a destination using a communication network. The mobile device is configured to obtain from one or more network nodes in the communication network, a first path over a first sub-region of a region towards the destination, and to follow the first path. The mobile device is further configured to, upon entering or being in a second sub-region of the region having a level of connectivity below a threshold, switch to follow a second path calculated locally at the mobile device.

The performance of the mobile device travelling towards a destination may be improved according to the embodiments herein. In such an approach, safety of the mobile device may be ensured at all times since the mobile device always has a path where obstacles are taken into account. Such an approach may comprise a mobile device and a process between the mobile device and one or more network nodes, e.g. a cloud server, that consider variability of connectivity along a route while ensuring that the mobile device has access to a path to the destination all the time, so far as allowable by a regional map.

Embodiments herein thus provide a mobile device and method to manage the location of autonomy in path planning.

BRIEF DESCRIPTION OF THE DRAWINGS

Examples of embodiments herein are described in more detail with reference to the attached drawings in which.

DETAILED DESCRIPTION

Figure 1:
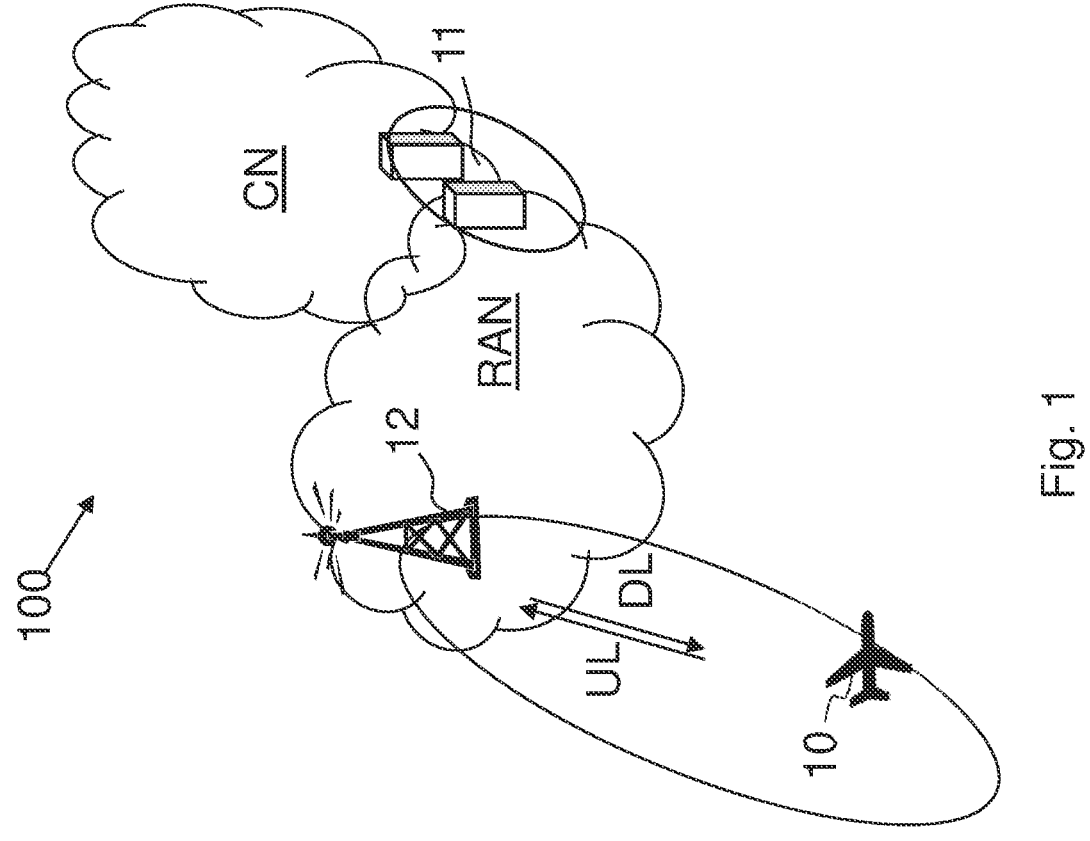
FIG. 1 is a schematic overview illustrating embodiments of a communications network.

FIG. 1 is a schematic overview depicting a communications network 100 wherein embodiments herein may be implemented. The communications network 100 comprises one or more Radio Access Networks (RANs) and one or more Core Network (CNs). The communications network 100 may use any technology such as 5G new radio (NR) but may further use a number of other different technologies, such as, Wi-Fi, long term evolution (LTE), LTE-Advanced, wideband code division multiple access (WCDMA), global system for mobile communications/enhanced data rate for GSM evolution (GSM/EDGE), worldwide interoperability for microwave access (WiMax), or ultra mobile broadband (UMB), just to mention a few possible implementations.

Mobile devices, such as a mobile device 10, operate in the communications network 100. The mobile device 10 may be any device moving within the communications network such as a mobile agent e.g. a vehicle such as an aerial vehicle and/or an unmanned vehicle. The mobile device 10 may e.g. be a mobile station, a non-access point (non-AP) STAtion (STA), an STA, a user equipment (UE) and/or a wireless terminal, an NB-internet of things (IoT) mobile device, a Wi-Fi mobile device, an LTE mobile device and an NR mobile device communicating via one or more Access Networks (AN), e.g. RAN, to one or more core networks (CN). It should be understood by those skilled in the art that "mobile device" is a non-limiting term which means any terminal, wireless communication terminal, wireless mobile device, device to device (D2D) terminal, or node e.g. smart phone, laptop, mobile phone, sensor, relay, mobile tablet, television unit or even a small base station communicating within a cell. The methods according to embodiments herein are performed by the mobile device 10.

Network nodes 11 operate in the communications network 100. Such a network node may be a cloud based server or an application server providing processing capacity for e.g. calculating paths or similar along a route to a destination for the mobile device. The communications network 100 may further comprise one or more radio network nodes 12 providing radio coverage over a respective geographical area by means of antennas or similar. The geographical area may be referred to as a cell, a service area, beam or a group of beams. The radio network node 12 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Mobile device to Mobile device (D2D) communication, or any other network unit capable of communicating with a UE within the cell served by the radio network node 12 depending e.g. on the radio access technology and terminology used.

Embodiments herein relate to allowing path planning of the mobile device 10 to be carried out both globally in the communications network and locally on-board the mobile device 10 by e.g. switching intelligently between the paths so as to assure safety of the mobile device 10 at all times. Safety of the mobile device, when used herein, may refer to that the mobile device has a safe path to a next high-connectivity region.

An advantage of embodiments herein is that path planning autonomy may be distributed intelligently between the one or more network nodes 11 and the mobile device 10. Further advantages of embodiments herein may be achieved through the enhanced execution protocol provided, which switches between global path planning, i.e. network node 11 controlled, and local path planning, i.e. mobile device 10 controlled, for a safe graph construction. An efficient use of embodiments herein may further be achieved through adaptive computation of safe graphs or safe subgraphs with density, which density may be dynamically calculated by taking resource constraints onboard the mobile device into account. Such resource restraints may e.g. be restraints on mobile device 10 memory, computation capability, battery, and time availability for download. Thus, usage of dynamic generation of safe subgraphs with adaptive density may achieve an efficient use. Another advantage of embodiments herein is that they provide an added value, since services using the proposed mobile device 10 and method may extend the applicability of 5G-based solutions to mobile device use cases depending on path planning. This will improve mobile device 10 service providers adopting 5G-based services.

Embodiments herein use a region that is partitioned into sub-regions being associated with a level of connectivity. Thus, some embodiments herein relate to partitioning a region into sub-regions of connectivity zones, i.e. partition a region within which a path is to be found from a source, e.g. the present location, to a destination. Each sub-region has an assigned level of connectivity, e.g. 0 or 1 wherein '0' is used to denote a sub-region with no or otherwise inadequate connectivity, and '1' is used to denote full or otherwise adequate connectivity. Sub-regions may thus also be referred to as connectivity zones.

In some embodiments herein, a solution is provided that comprises a protocol for switching between the local path planning, performed in the mobile device's processor, and global path planning, performed elsewhere in the communications network 100. This protocol may be divided in two phases: phase 1 and phase 2. When employing the phase 1 protocol, the mobile device 10 is in a 1-connectivity zone, meaning that the connectivity is full or otherwise adequate. In such a connectivity zone, the mobile device 10 follows a first path. If there is an obstacle, the mobile device 10 communicates with one or more network nodes 11 in the communications network 100 to get a different path and a subgraph for the subsequent sub-region with no or otherwise inadequate connectivity, herein referred to as 0-connectivity zone. The path which the mobile device 10 follows through the 1-connectivity zone may ideally be such that the mobile device 10 has sufficient time to download the required subgraph. At the boundary point, which is the entry point to the 0-connectivity zone, the mobile device 10 follows the phase 2 protocol.

When employing the phase 2 protocol, the mobile device 10 is in a boundary point or in a 0-connectivity zone. Under such conditions, the mobile device 10 re-plans its path locally to reach a boundary point, which is an entry point to the subsequent sub-region i.e. a 1-connectivity zone. At the boundary point, the mobile device 10 communicates with the one or more network nodes 11 to get a next safe subgraph downloaded. The mobile device 10 may wait at the boundary point, e.g. by hovering, until the safe subgraph has been downloaded. When the safe subgraph has been downloaded, the mobile device follows the phase 1 protocol.

At each point in the path from a starting point to the destination, the mobile device may maintain a subgraph of the entire map such that:

(1) every point on the subgraph is reachable from the present location and the destination is reachable from every point on the subgraph;

(2) an intersection of the subgraph with the current sub-region is a single path if the current level of connectivity is 1, and may be a fully dense map if the level of connectivity is 0; and (3) only boundary points of sub-regions may be maintained in the mobile device 10 for the subsequence zones.

When used herein, a fully dense map may refer to a map comprising as much map data input as possible, i.e. comprising all accessible information of map data such as roads, buildings, obstacles, zones of restrictions or other important information for route planning. Furthermore, when used herein, boundary points refer to points on the boundary between sub-regions and may be said to represent gateways leading to 1-connectivity zones. A subgraph fulfilling the requirements (1)-(3) above is referred to as a safe subgraph.

An advantage of embodiments herein is that an ability for the mobile device to plan path autonomously when required is provided. Since the employed subgraph is safe in every point during the flight of the mobile device 10, the mobile device 10 is never orphaned. This means that the mobile device 10 never reaches a situation where the mobile device is in an inadequate connectivity zone and/or without a map with which to re-plan the path locally.

Further advantages of embodiments herein comprise reduced strain on memory and computation capability, since the subgraph may be a small portion of an entire map.

Figure 2A:
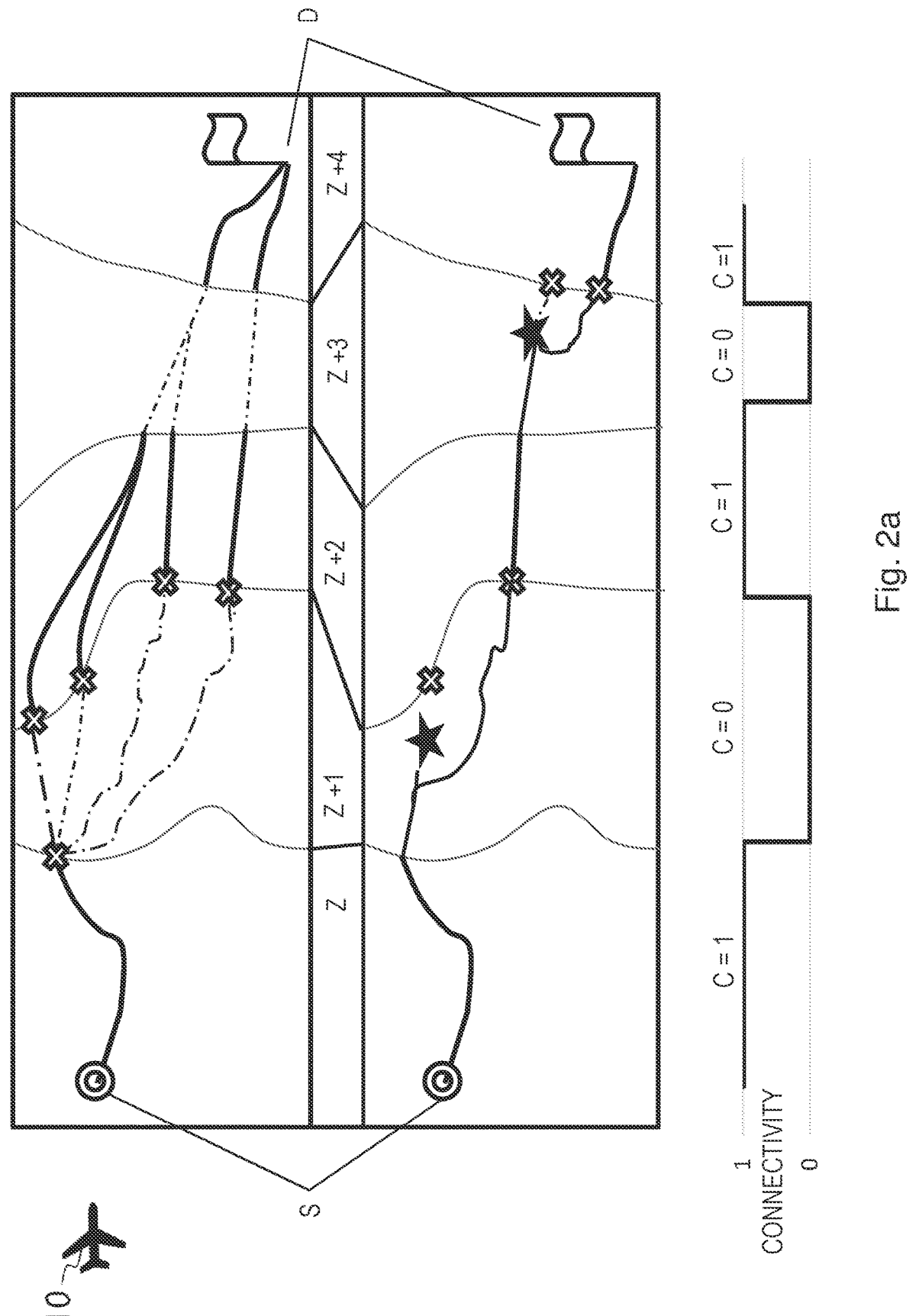
FIGS. 2a-b are schematic diagrams illustrating a travel of a mobile device according to embodiments herein.
Figure 2B:
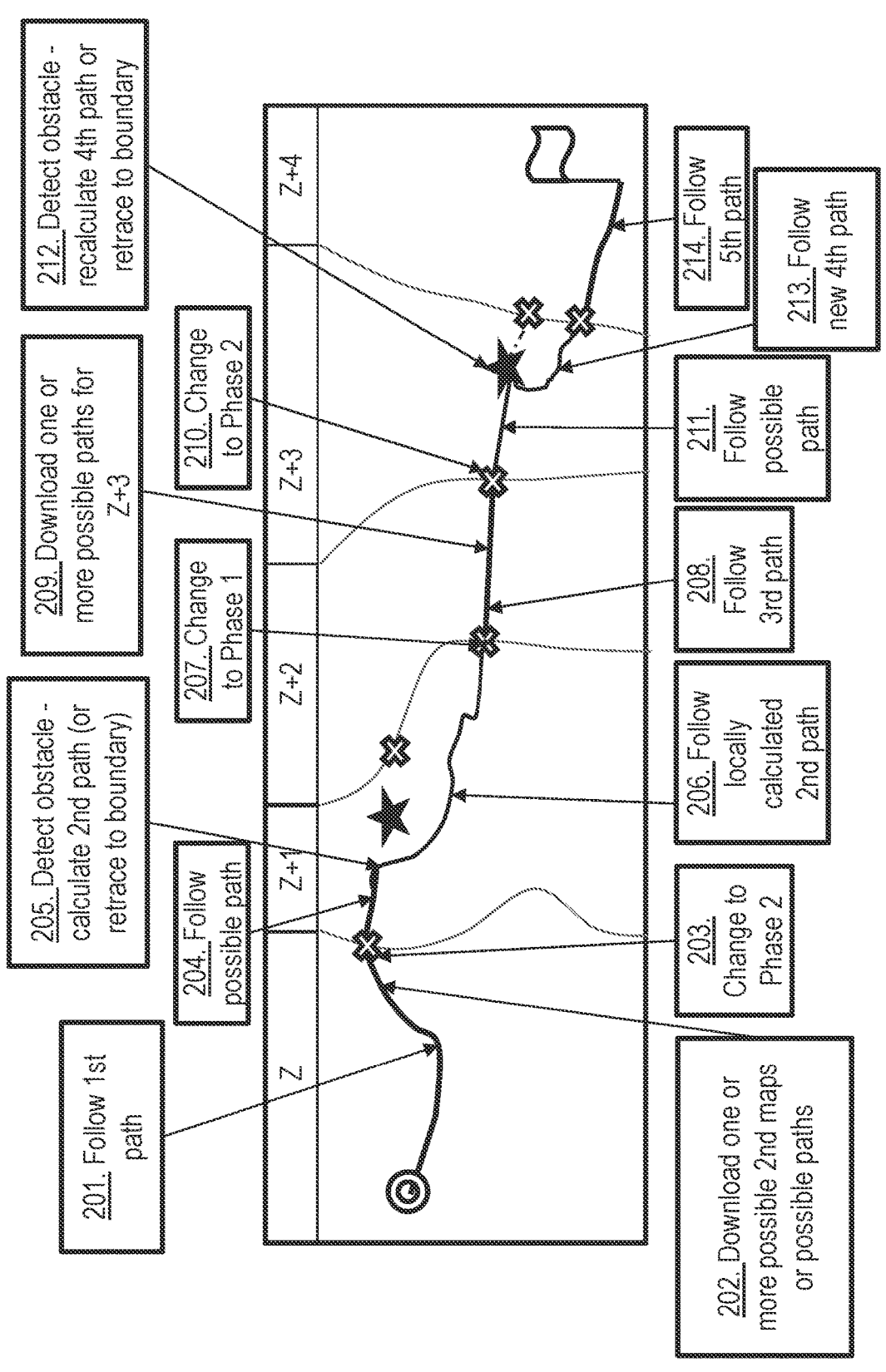

FIGS. 2a and 2b depict the alternating phases of the protocol by means of an example scenario where the mobile device 10 travels from a starting point S, also referred to as an initial location, to the destination point D, also referred to as a goal location, over a region. The mobile device 10 thereby crosses a plurality of sub-regions of the region, which sub-regions may also be referred to as zones. The sub-regions may differ in connectivity, where C=1 indicates a sub-region with adequate connectivity and C=0 indicates a sub-region with inadequate connectivity. In FIG. 2a, two maps are shown, where the top-most map shows one or more possible paths the mobile device 10 may take, and the lower-most map shows the outcome trajectory of the mobile device 10 in the example scenario.

In FIG. 2a, the corresponding connectivity levels of the sub-regions are indicated by the graph below the maps. FIG. 2b is an annotated version of the lower-most map in FIG. 2a. As mentioned above, in the example scenario depicted in both FIGS. 2a and 2b, the mobile device 10 is tasked with travelling from the initial location to the destination. As can be seen in the figures, the initial point is located at point S in the sub-region Z, and the destination is located at point D, in the sub-region Z+4.

Thus, the mobile device 10 begins its journey at S in the sub-region Z, which is a sub-region with a connectivity level equal to or above a threshold, e.g. a C=1 sub-region, and thus, the mobile device 10 may continue along a single path, also referred to as the first path, see action 201.

In the sub-region Z+1, subsequent to the sub-region Z, however, the level of connectivity is below the threshold, e.g. a C=0 sub-region. In the sub-region Z+1 the connectivity is inadequate for the purpose of controlling the mobile device 10 via the network nodes 11 and therefore, the mobile device 10 may need to cross the sub-region Z+1 independently. This means that the phase 2 protocol may be employed in the Z+1 sub-region, see action 203. In order for the mobile device 10 to be able to follow the phase 2 protocol however, one or more possible second maps or possible paths may be downloaded to the mobile device 10 in the first sub-region Z, see action 202. The one or more second paths may also be referred to as one or more second safe subgraphs. The network node 11 calculated possible paths may be downloaded to the mobile device 10 before the mobile device 10 enters the Z+1 sub-region, since there will be inadequate connectivity in that sub-region. Therefore, during the crossing of the Z sub-region for example, the one or more paths covering the sub-region Z+1 may be downloaded to the mobile device 10.

Using the one or more downloaded second paths, a path through the Z+1 sub-region may be determined and followed see action 204. In FIG. 2b, this path is referred to as a possible path. An objective of determining a possible path is to find a suitable path to a boundary point on the edge between the sub-region Z+1 and the subsequent sub-region, Z+2. Examples of calculated paths from the boundary between Z and Z+1 to the boundary between Z+1 and Z+2 are illustrated with dashed lines in FIG. 2a. These dashed lines all lead to exemplified boundary points.

When the mobile device 10 encounters an obstacle in the zone Z+1, it cannot rely on a functionality in the communication network 100 to re-plan the path through the sub-region Z+1. Since there is inadequate connectivity in the sub-region Z+1, the mobile device 10 locally calculates a second path independently of the one or more network nodes 11, e.g. upon detecting an obstacle, see action 205. In such a scenario, the mobile device 10 is capable of recalculating the second path. It should be noted that if the mobile device 10 is unable to recalculate a second path through the second sub-region Z+1, the mobile device 10 may retrace its journey back to the boundary between the sub-regions Z and Z+1, which is a last known location where the mobile device 10 had an adequate connection to the communication network 100, and either retrieve alternate paths or select an alternate path. The mobile device 10 may then return to the boundary between the sub-regions Z and Z+1, since it was unable to calculate a second path upon encountering an obstacle on the shortest path from the boundary point on the sub-region Z to the boundary point on the sub-region Z+2. At the boundary, the mobile device 10 receives a new path on which to traverse the sub-region Z+1.

According to the illustrated example the mobile device 10 follows the second path to the third sub-region Z+2, see action 206. Having successfully traversed the second sub-region Z+1 by means of the calculated second path, the mobile device 10 enters a third sub-region Z+2. The sub-region Z+2 is a sub-region with a level of connectivity above or equal to the threshold, e.g. C=1 sub-region, so the mobile device 10 may again switch to the phase 1 protocol and be controlled by functionality in the communications network 100 and, thus, it may follow a single path through the sub-region Z+2, see actions 207-208. In FIG. 2b, this path is referred to as the third path. If the mobile device 10 encounters an obstacle in the Z+2 sub-region, it communicates with the one or more network nodes 11 to get a different path. The mobile device 10 may also communicate with the one or more network nodes 11 to require one or more possible paths for a subsequent sub-region Z+3 i.e. a fourth sub-region, which may e.g. be a C=0 sub-region. These possible paths may be downloaded to the mobile device 10, see action 209.

At the boundary point of the sub-regions Z+2 and Z+3, which is an entry point into the fourth sub-region Z+3, the mobile device 10 may again switch to use the phase 2 protocol, see action 210. In accordance with the phase 2 protocol, the mobile device 10 may follow a possible path downloaded previously, see action 211, and the mobile device may calculate a fourth path to a boundary point on the edge between the sub-regions Z+3 and Z+4, e.g. upon detection of a change of a parameter, such as a value from a sensor or a measurement of signaling quality, being associated with describing an environment of the fourth sub-region such as parameter indicating a detection of an obstacle, see action 212. Therefore, the mobile device 10 does not need to return to the boundary with the previous sub-region, Z+2 for connecting to the cloud. In FIG. 2b, this path is referred to as the new fourth path, and the mobile device 10 follows the fourth path, see action 213.

Having reached a boundary point on the edge between the sub-regions Z+3 and Z+4, the mobile device 10 communicates with the one or more network nodes 11 to get a next safe subgraph, i.e. a safe path through the fifth sub-region Z+4, downloaded. In the example scenario, the mobile device's destination point D is located in the sub-region Z+4 and thus it requests, from the one or more network nodes 11, a path to the destination point D. In FIG. 2b, this path is referred to as the fifth path.

When the safe subgraph, or map, comprising the path has been downloaded, the mobile device 10 follows the phase 1 protocol. Unless it encounters obstacles and must re-plan the route towards the destination, the mobile device 10 follows the downloaded path and consequently reaches its destination, see action 214. A density of the downloaded safe subgraphs comprising the various possible paths may be based on the available resources in the mobile device 10 and/or the communications network, which will be discussed more in detail below.

Figure 3:
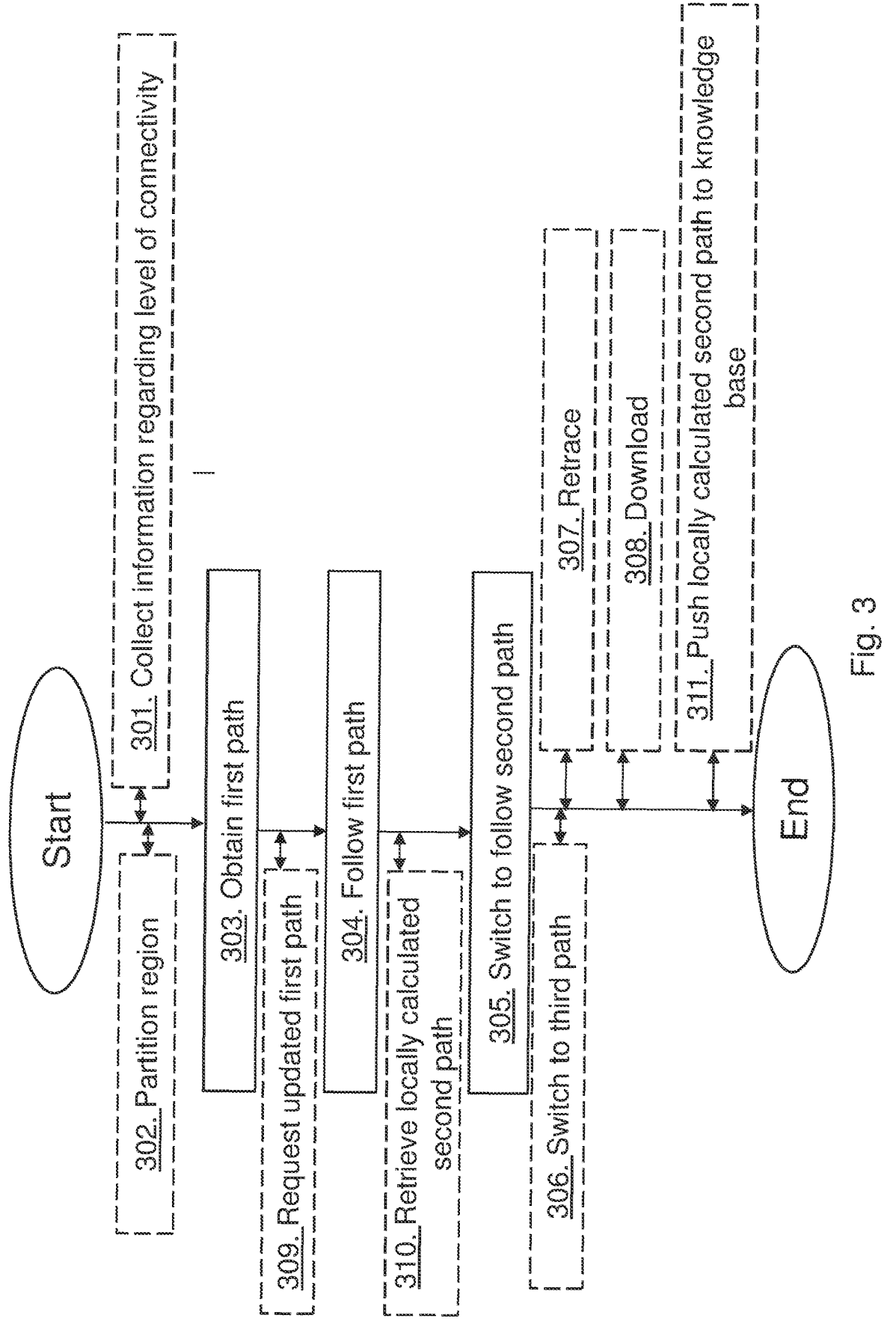
FIG. 3 is a schematic overview depicting embodiments of a method performed by a mobile device in the communications network.

Example embodiments of a method performed by the mobile device 10 for travelling towards a destination using the communication network 100 will now be described with reference to a flowchart depicted in FIG. 3. The mobile device 10 may be represented by any mobile agent such as e.g. an aerial vehicle and/or an unmanned vehicle. The method comprises the following actions, which actions may be taken in any suitable order. Actions that are optional are presented in dashed boxes in FIG. 3.

Action 301. In an example scenario herein, the mobile device 10 may collect, internally and/or externally of the mobile device 10, information regarding the level of connectivity in the region. This information may e.g. be retrieved from a network node 11 or a database. The mobile device 10 may in some scenarios locally perform measurements and collect information of level of connectivity.

Action 302. The mobile device 10 may further partition the region into sub-regions based on the level of connectivity. The region may thus be partitioned into at least the first and the second sub-region.

Action 303. The mobile device 10 obtains, from the one or more network nodes 11 in the communication network, the first path over the first sub-region of the region towards the destination. The region may comprise more than one sub-region.

Action 304. The mobile device 10 follows the obtained first path.

Action 305. Upon entering or being in the second sub-region of the region, wherein the second sub-region has a level of connectivity below a threshold, the mobile device 10 switches to follow a second path towards the destination, calculated locally at the mobile device 10. E.g. upon detection of a change of a parameter being associated with describing an environment of the second sub-region e.g. detecting an obstacle, a weather change or similar, the mobile device 10 switches path to follow the second path calculated locally at the mobile device.

Action 306. Upon entering or being in a third sub-region having a level of connectivity equal to or above the threshold, the mobile device 10 may switch path to follow a third path calculated at the one or more network nodes, over the third sub-region of the region.

Action 307. Upon not being able to calculate the second path within the second sub-region, the mobile device 10 may retrace to a last position where the level of connectivity is equal to or above the threshold.

Action 308. Upon entering or being in the first sub-region having a level of connectivity above or equal to the threshold, the mobile device 10 may download a safe subgraph of a map for the second sub-region. The safe subgraph may comprise one or more possible paths over the second sub-region. A density of path possibilities of the safe subgraph may be based on capability and/or available capacity of the mobile device 10 and/or the communication network 100.

Action 309. In some embodiments, if the mobile device detects an obstacle in the first sub-region, the mobile device 10 may request an updated first path from the one or more network nodes 11.

Action 310. Upon detecting an obstacle in the second sub-region, the mobile device 10 may retrieve the locally calculated second path from a map at the mobile device comprising a number of path possibilities.

Action 311. Upon entering or being in the third sub-region having a level of connectivity above or equal to the threshold, the mobile device 10 may push the locally calculated second path to a knowledge base such as a database. The mobile device 10 may also, or instead of the path, push information related to the calculated second path to the knowledge base. Such information may comprise path indications, objects detected and/or measurements performed. Thereby, future path planning may be improved by taking the acquired knowledge into account.

Embodiments herein such as those mentioned above will now be further described and exemplified. The text below is applicable to and may be combined with any suitable embodiment described above.

The terms annotated map, intelligent execution control and safe subgraph construction may be used in embodiments herein.

The annotated map may partition an available region or map of a region according to level of connectivity, given by C=1 indicating good connectivity, and given by C=0 indicating poor connectivity. The annotated map may also comprise one or more graphs, whose density may be adaptively calculated from the mobile device resources, i.e. computation capability, storage space and energy, and a time available for downloading the graph, e.g. until entering a low connectivity sub-region. The map may be partitioned into sub-regions of level of connectivity, e.g. with a connectivity level of 0 or 1, where 0 denotes poor connectivity and 1 denotes good connectivity.

Intelligent execution control means that, in embodiments herein, execution control may be modified to intelligently switch location of autonomy from the mobile device 10 to the communications network 100. Such an execution control may be performed by a modified execution protocol that switches between global, i.e. communications network based, and local, i.e. mobile device based, path planning. In prior art solutions, path planning is either performed wholly in the communications network 100 or wholly in the mobile device 10, both of which can be unsafe for the mobile device 10, due to non-perfect connectivity or constrained resources.

Safe subgraph construction is a computation of an adaptive safe subgraph, which may be dynamically calculated. The safe subgraph comprises boundary points and at each boundary point, a segment of the graph with multiple possible paths that reach the next checkpoint is retrieved from the one or more network node 100 by the mobile device 10. Such a safe subgraph may enable true edge autonomy, i.e. automatic path planning over a full path, for the mobile device 10. For sub-regions of poor connectivity, a safe graph (SG) or safe subgraph and a preferred path (P) may be pushed to the mobile device 10. The density of the SG and P may be adaptively calculated, e.g. by accounting for resource constraints onboard the mobile device 10, such as storage space, computation capability, battery and time available for download. Since the SG may only be pushed to the mobile device 10 for C=0 zones, the strain on storage space onboard the mobile device 10 is decreased.

In sub-regions with full connectivity, i.e. C=1 zones, the path planning occurs in the communications network 100, and the mobile device 10 follows the path generated by the one or more network nodes 11 in the communications network 100.

Figure 4A:
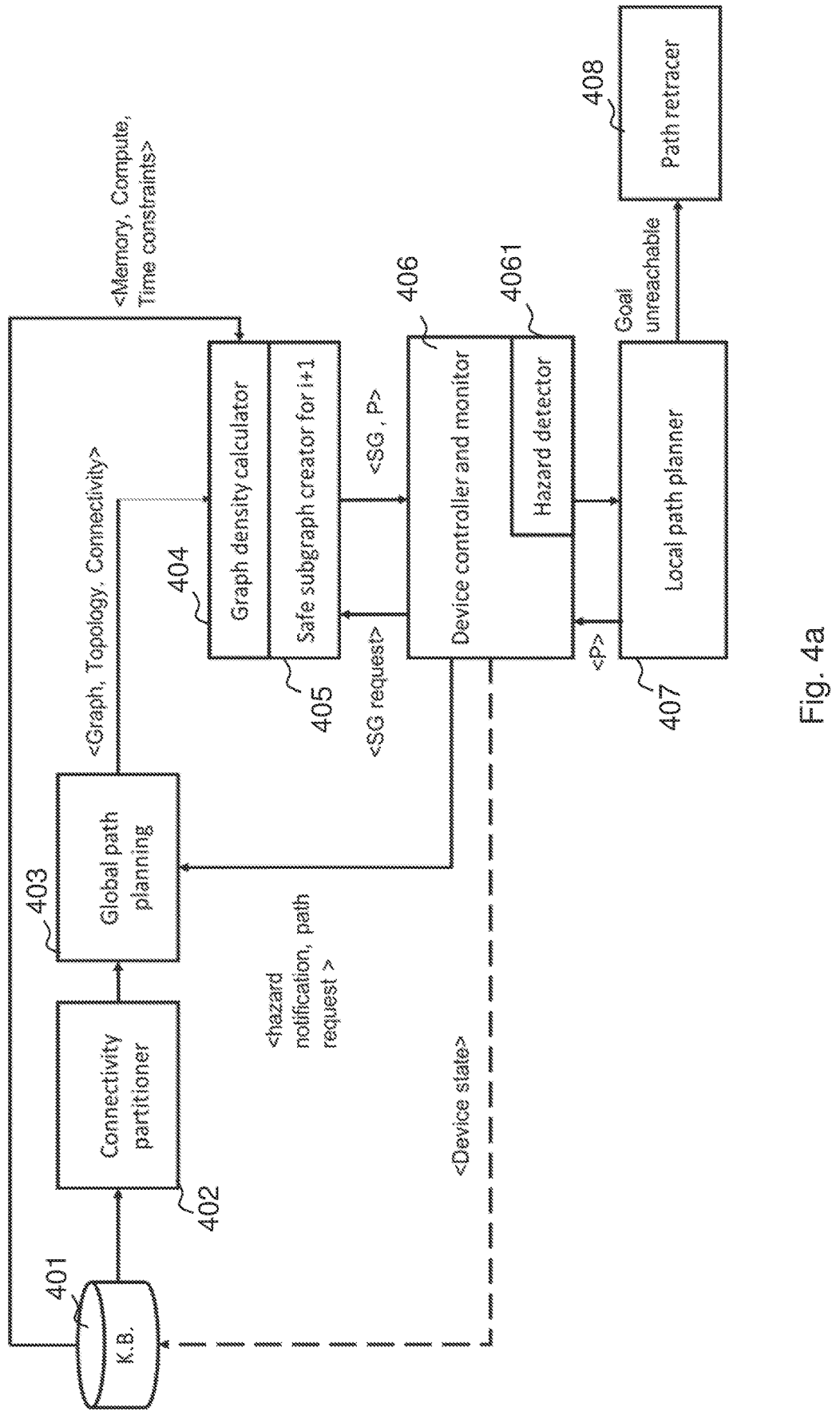
FIGS. 4a-d are schematic block diagrams depicting embodiments herein.

FIGS. 4a-4e depict architecture and modules of some embodiments herein. In FIG. 4a the following components are depicted:

a knowledge base (KB) 401,
a connectivity partitioner (CP) 402,
a global path planner (GPP) 403,
a graph density calculator (GDC) 404,
a safe subgraph creator 405,
a mobile device controller and monitor (DCM) 406, which may comprise a hazard detector (HD),
a local path planner (LPP) 407, and
a Path Retracer (PRT) 408.

Figures 4B, 4C, 4D:
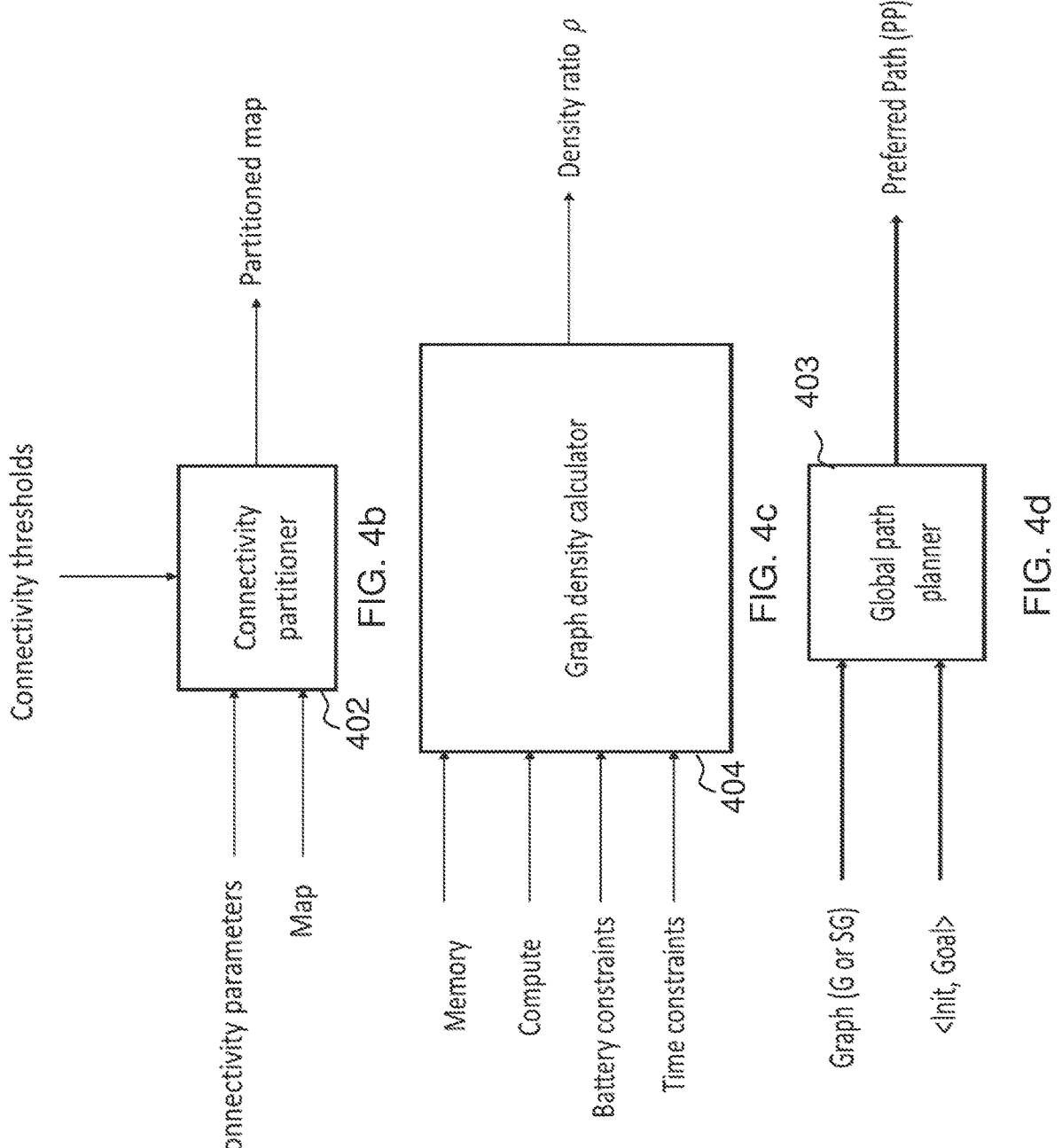

The CP 402, depicted in FIG. 4b, retrieves the region, such as a topological map, and coverage information i.e. level of connectivity also referred to as connectivity parameters, e.g. from the knowledge base (KB) 401, and creates a partitioned map of sub-regions with no connectivity, e.g. C=0, and full connectivity, e.g. C=1. This may e.g. be a thresholding system that compares key performance indicators (KPIs) of each sub-region with a threshold KPI.

The graph density calculator (GDC) 404 is depicted in FIG. 4c. At each window, i.e. time window where the mobile device is connected to the communications network, a local graph may be pushed to the mobile device 10, which may be the input to a local path planner 408. The density of this local graph, which may be calculated by the GDC 404, is a critical indicator of the level of autonomy available to the mobile device 10. The denser the graph, the higher the number of paths, and the greater the possibility of finding a path to the destination, due to probabilistic completeness. However, a denser graph may require more time for download and more computation capability to find a path. Hence, a density ratio may need to be selected correctly. The GDC 404 may account for these factors and may output a density ratio, given by the number of edges in a local graph in a particular sub-region divided by the number of edges in a global graph in that same sub-region as illustrated by the following equation.

$$\frac{\sum \text{edges in local graph in region}}{\sum \text{edges in global path in region}} = \text{Density ratio } \rho$$

The global path planner (GPP) 403, depicted in FIG. 4d, may take any graph, such as the global graph (G) or the SG for a sub-region, as well as the initial and destination coordinates. If the destination is reachable, the GPP 403 finds the path e.g. a preferred path (PP). The GPP 403 may be located in the communications network 100, with access to large computation capability. As a result of the access to large computation capability, the GPP 403 may use exhaustive search methods.

The local path planner (LPP) 407, depicted in FIG. 4a, may have similar functionality as the GPP 403, however it may be located onboard the mobile device 10, and the computation capability for path planning may therefore be limited. The LPP 407 may therefore only be fed the local graph for a particular sub-region, such as the safe graph SG, which is available in the mobile device's storage space.

The mobile device controller and monitor (DCM) 406, depicted in FIG. 4a, may be responsible for following the preferred path. Furthermore, the DCM 406 may be responsible for monitoring the mobile device's path-following performance, which includes the mobile device autopilot and controllers, actuators and sensors. The DCM 406 may also publish the state of the mobile device 10 at regular time intervals to the KB 401.

The hazard detector (HD) 4061 monitors the environment for hazards or objects, and may send a notification if a hazard is detected. A hazard, when used herein, may be any deviation in the environment.

The knowledge base (KB) 401, depicted in FIG. 4a, may comprise knowledge of topological maps, global graphs, coverage information for a region, inventory of mobile devices and their onboard resources, and the current state of the mobile device from the DCM 406. Onboard resources of the mobile device 10 may e.g. comprise storage space, computation capability, and battery capacity. The current state of the mobile device 10 may comprise information such as position, battery usage, memory usage, and online or offline planning modes.

The path retracer (PRT) 408, depicted in FIG. 4a, may maintain information about the nearest full connectivity, e.g. C=1, sub-region and related boundary points. The PRT 408 may at all times compute a path to retrace the mobile device to this high connectivity sub-region.

Figure 4E:
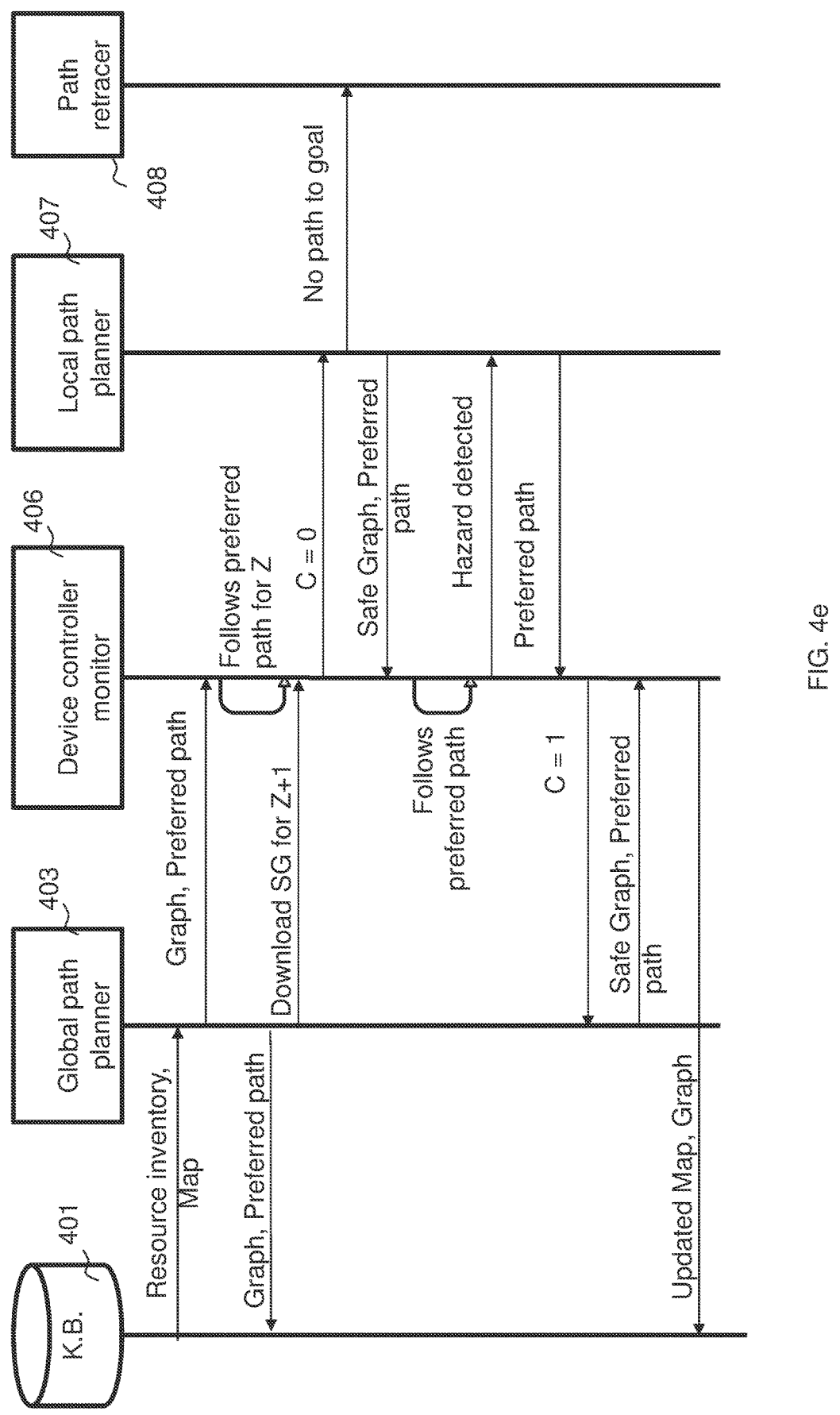
FIG. 4e is a signalling scheme depicting embodiments herein.

Some embodiments herein related to the execution protocol, mentioned above, will now be further described and exemplified in reference to FIG. 4e. The text below is applicable to and may be combined with any suitable embodiment described above.

Information from the KB 402 is retrieved to the GPP 403, such as resource inventory and map data. The GPP 403 outputs a graph and/or a preferred path to the DCM 406 and KB 401. In the C=1 zones with adequate connectivity, a path to a boundary point and a safe subgraph from that boundary point to the destination is to be found. In the example scenario described here, a first part, i.e. a head, of the safe subgraph may be a dense map inside the subsequent C=0 zone with inadequate connectivity. In planning the flight, a balance must be achieved between the time required to plan the flight in the single path in the current C=1 zone, the available battery power of the mobile device, the mobile device's storage capacity and the size of the subsequent safe subgraph, SG. If, for example, the required time is constrained, or the available storage is limited, a safe subgraph with a less dense head may be computed. On the other hand, if it is known via other sources, such as other mobile devices, that the subsequent C=0 zone has many unknown obstacles, a subgraph with a more dense head may be needed for that zone. Hence, the flight plan in the current C=1 zone may be adjusted accordingly so that it e.g. takes more time to fly. A longer flight time may e.g. be achieved by hovering or taking a more circuitous route, if it is allowed by the available battery power in the mobile device. For the entire task of flying from an initial point to a goal, there may exist a preferred path which is calculated globally by the GPP 403. In most circumstances, such a preferred path is followed.

In an example scenario, the mobile device 10 may be in a sub-region Z, which is a C=1 zone, which means that the mobile device 10 is in a sub-region where the connectivity is adequate for its purposes. In the sub-region Z there may e.g. be no hazards detected and, thus, the preferred path may be followed. While following the preferred path, the mobile device 10 may acquire the Safe graph SG for a subsequent sub-region such as the second sub-region. The subsequent sub-region may be expressed as the Z+1th sub-region. Safe graphs for the Z+1th to the Z+nth sub-region may be acquired from the global path planner.

If a hazard is detected, the mobile device 10 may send a request to the global path planner in the communications network 100, which may provide one or more new SG.

In the example scenario, the mobile device 10 may then enter the subsequent sub-region, i.e. the Z+1th sub-region, which is a C=0 zone, i.e. the level of connectivity in the second sub-region is inadequate for the mobile device's purposes. If no hazard is detected, the mobile device 10 may follow a preferred path from the GPP.

On the other hand, with the proviso that a hazard is detected, local calculation of the path i.e. on-board planning may be done on the current subgraph of the safe graph. E.g. the LPP receives an indication that a hazard is detected and performs a local calculation for obtaining a preferred path. This preferred path is then provided to the DCM.

If the mobile device 10 cannot find a path to its destination, i.e. the goal is unreachable, the PTR 408 may guide the mobile device 10 back to the last known high-connectivity sub-region. In the example scenario, if the mobile device 10 fails to cross the Z+1th sub-region, the PTR 408 will retrace the mobile device back to the boundary with the Z sub-region.

Furthermore, the mobile device 10 may enter another sub-region of a level of connectivity above or equal the threshold and may retrieve SG and PP from the one or more network nodes such as GPP 403 and the mobile device 10 may further transmit the locally calculated path to the KB 401 for updating the map and/or graph.

The example scenario described here and depicted in FIG. 4e illustrates these interactions between the components in some embodiments herein, and provide an example of how the autonomy may be switched between the local and global path planning. As mentioned above, local path planning occurs onboard the mobile device, while global path planning is performed in the cloud.

Figure 5:
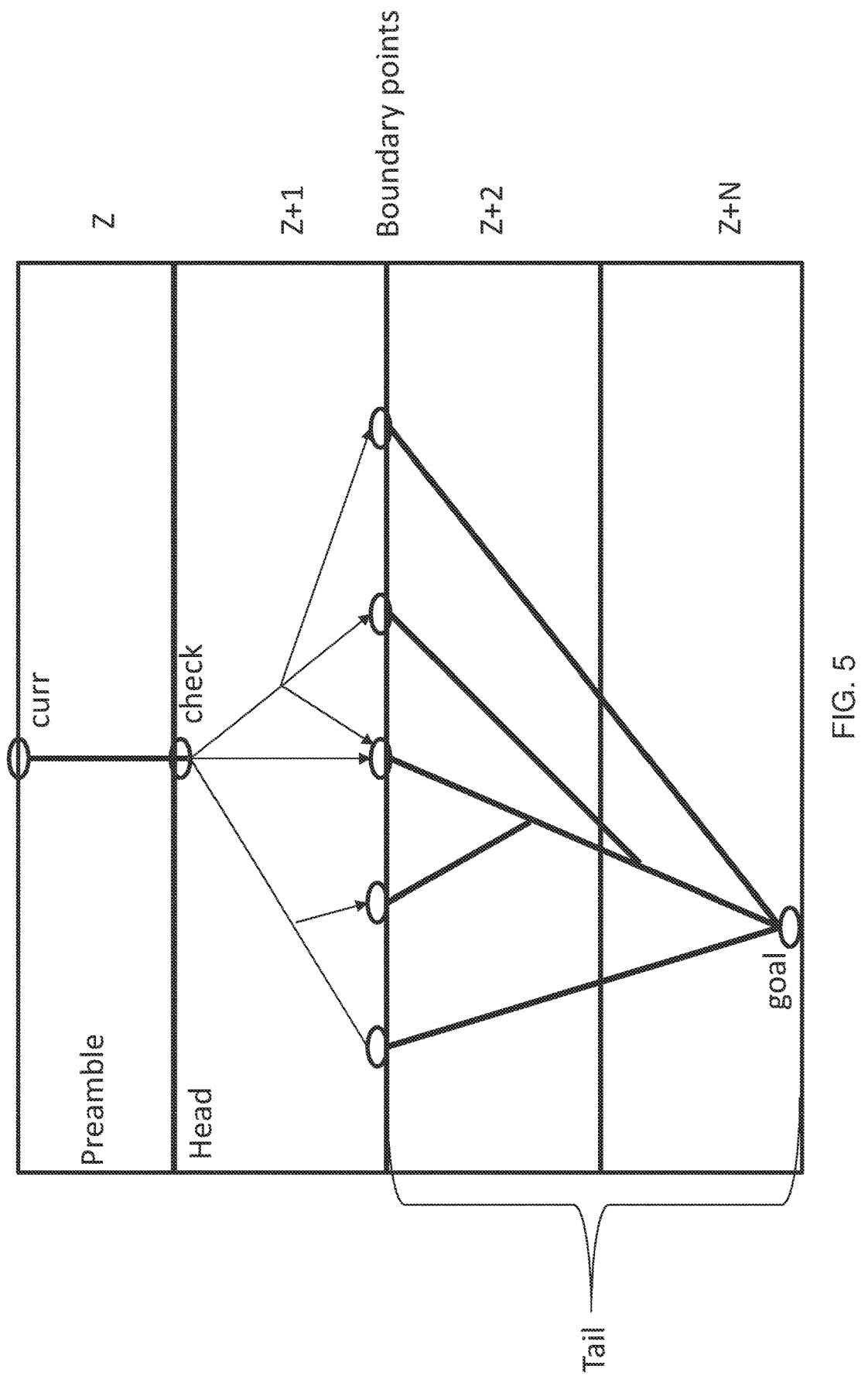
FIG. 5 is a schematic overview depicting embodiments of a safe graph according to embodiments herein.

Some embodiments herein related to the safe subgraph creator (SSC) 405, mentioned above, will now be further described and exemplified with reference to FIG. 5. The text below is applicable to and may be combined with any suitable embodiment described above.

The SSC 405 may be located in the communications network 100, and may comprise a cloud-based path planner. The safe subgraph that is pushed to the mobile device 10 may be created by the SSC 405 as a subset of the global graph. The number of edges may be given by the density, calculated by the GDC 404, multiplied by the number of edges in the global graph in that sub-region. This may be expressed as:

$$\text{Density ratio } \rho \times \Sigma \text{ edges in global path in region} = \Sigma \text{ edges in local graph in region}$$

The graph given by the number of edges in a sub-region may be referred to as a safe graph (SG). The SG may be created via sampling of the global graph and with a uniformly random distribution dropping $1-\rho$ percentage of edges.

When the global graph is built, the critical edges may be identified by the GPP 403 as a matter of standard procedure. These critical edges may be ensured to always be retained.

An SG, comprising a present location and a destination, may also be referred to as a safe subgraph between a current node and a goal node. The SG may comprise three parts:

a preamble—i.e. a path from the current node to an intermediary node, a "check" head—i.e. a directed acyclic graph rooted at the node "check", and a tail—i.e. a set of paths from the boundary points of head to the goal node or destination.

The input for the SSC 405 may e.g. be the current connectivity zone Z, a global graph, a density ratio, and critical links. With such input the SSC 405 may create an SG such where:

the preamble is the first path in the sub-region Z;

the head is a subset of the global graph in the sub-region Z+1, G_{Z+1}, with density ρ with regards to G_{Z+1} retaining all the possible paths in this sub-region; and the paths in the tail are paths in the global graph in the zones Z+2 . . . Z+N etc, all the way to the destination.

In an example scenario, the relationship between graph density, level of autonomy and onboard memory of the mobile device 10 may be illustrated. In the example scenario, a sampling-based method such as probabilistic roadmaps (PRM) may be used to build a roadmap during path planning. It should be noted that the proposed method in this example scenario is general and may apply to all path planning methods. For the purpose of the example scenario, the path planning may be carried out for a region of the size 25 square meters*25 square meters. The region comprises an inner boundary and some obstacles. Implementing PRM in the region results in a roadmap and a resulting path for a given initial state and a destination state.

In the example scenario, a roadmap comprising only a path requires around 320 bytes of storage space in the mobile device 10. The edge autonomy for such a roadmap would be very low, meaning that only path following can occur on the edge.

A roadmap comprising a sparse map, such as a map of 100 nodes and a branch size of 2 meters, would occupy around 11 KB of storage space in the mobile device 10. Such a roadmap would provide a medium level edge autonomy, where there is a possibility of finding a feasible path autonomously, if the sparse map has the necessary connections to reach the goal.

A roadmap comprising a dense map, such as a map of 1000 nodes and a branch size of 2 meters, would occupy around 1.1 MB of storage space in the mobile device 10. Such a roadmap would provide a high level edge autonomy, meaning that the mobile device 10 may explore the dense map and find an alternate path to the next checkpoint.

Thus, from this comparison it can be seen that the higher the density of the map, the higher the edge autonomy level. With a higher density map and a higher edge autonomy level, the storage requirements increase as well.

Sampling-based planners used in path planning are probabilistically complete, i.e. as the number of samples approaches infinity, the probability of complete space exploration is 1. Consequently, the more samples there are, the higher the level of space exploration. It is, thus, more probable to find a path in denser maps than in sparser maps.

A strategy where the mobile device 10 has access to dense maps for greater autonomy, while being efficient in the storage utilized is therefore provided in embodiments herein. Such a strategy is particularly significant since, even if a mobile device 10, for example, has 8 GB onboard memory or more, most of the storage space is required by the mobile device's 10 operating system. In a typical scenario, image data, for example, may be quite large. The above example scenario was based on finding a roadmap for a small space, i.e. 400 m², but in real flight planning, an applicable space could be over 10 square kilometers. Thus, the storage footprint for pushing a dense map to the mobile device 10 can be very high indeed.

Further examples of additional embodiments herein will be explained by means of the following example embodiments.

One example embodiment the partitioned region may comprise live and dead zones, with predictions of dead zones, e.g. from a coverage map. In a live zone there is continuous control of the mobile device 10, e.g. through the network node 11. In a dead zone a path of a pushed SG may be calculated by the mobile device 10.

In another example embodiment, a sparse graph may be pushed at the minimum, even in live zones with strong connectivity. Such an embodiment allows for at least local path planning, e.g. due to unanticipated changes in coverage. In known dead zone, a dense map may instead be pushed to the mobile device 10.

A further example embodiment may employ adaptive learning based on live feedback from the field, e.g. from sensors and measurements on the mobile device 10. In a C=0 sub-region, for example, the mobile device 10 may record all the obstacles it has encountered and the path that it has traversed in the sub-graph. When the mobile device 10 later enters a C=1 sub-region, the acquired information may be pushed to the KB. Based on the information provided, the GPP 403 in the communications network may update and reconstruct the graph for the future fleet.

In yet another example embodiment, the cost for the mobile device 10 operator and/or the mobile device 10 user may be minimized, based on the service provider's cost, which may in turn be based on the service provided in the sub-region, e.g. 3G or 5G. This could result in minimization of cloud access cost, such as e.g. accessing cloud services application programming interfaces (API) and data transfer costs since the data is only transferred in high connectivity zones.

Figure 6:
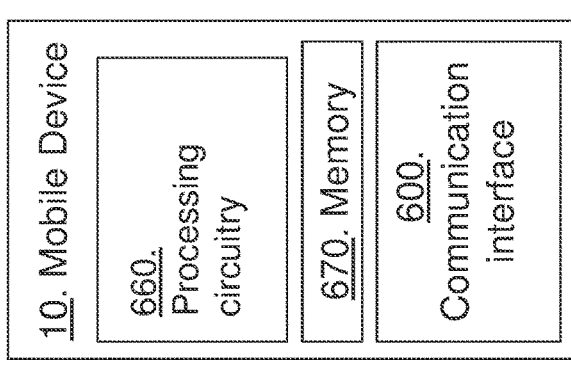
FIG. 6 is a schematic block diagram illustrating a mobile device according to embodiments herein.
Figure 6:
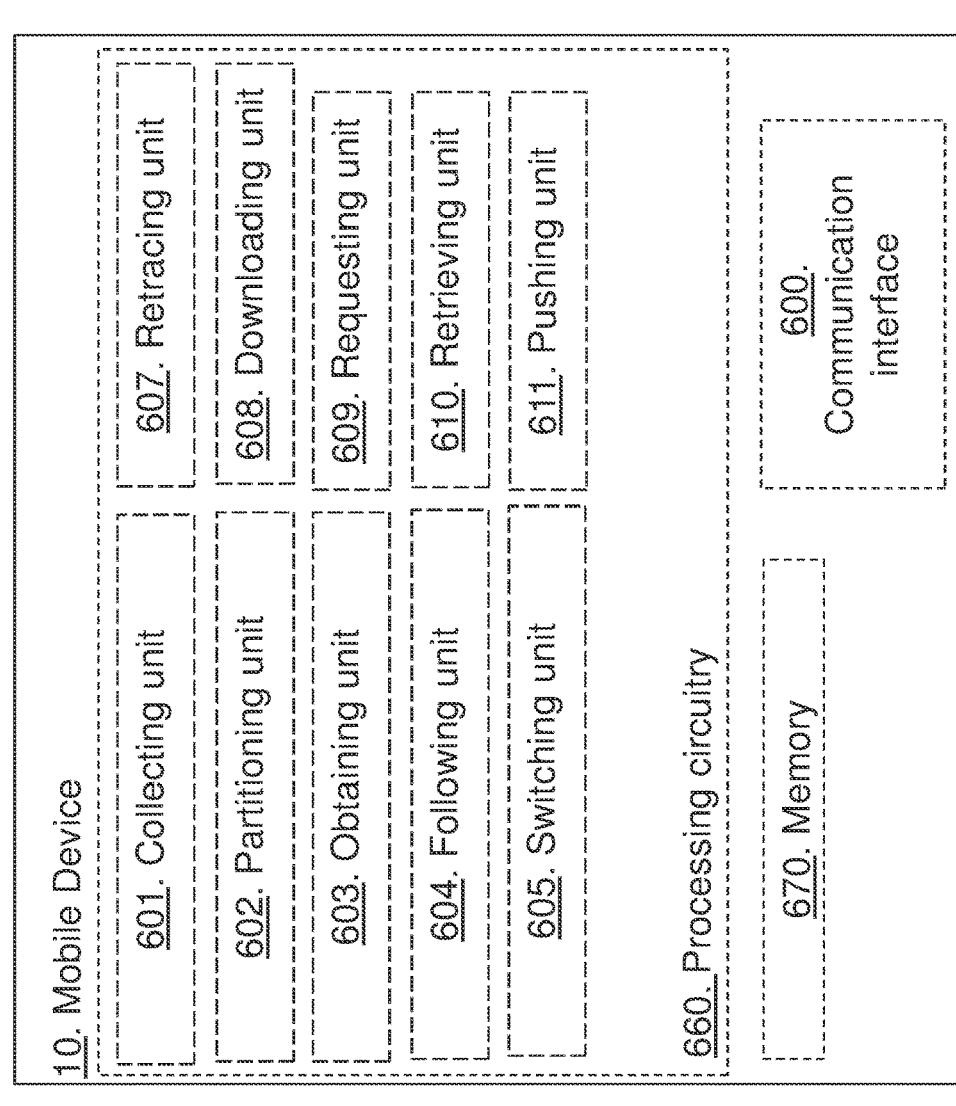
Figure 6:
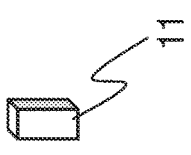
Figure 6:
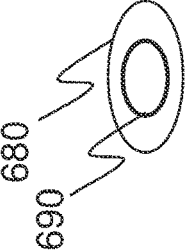

To perform the method actions above for travelling to a destination using a communication network 100, the mobile device 10 may comprise an arrangement depicted in FIG. 6.

The mobile device 10 may comprise a communication interface 600 depicted in FIG. 6, configured to communicate e.g. with the communications network 100 also referred to as a cloud network. The communication interface 600 may comprise a wireless receiver (not shown) and a wireless transmitter (not shown) and e.g. one or more antennas. The embodiments herein may be implemented through a processing circuitry 660 configured to perform the methods herein. The processing circuitry may comprise one or more processors. Thus, it is herein provided a mobile device comprising processing circuitry and memory, said memory comprising instructions executable by said processing circuitry whereby said mobile device 10 is operative to perform the methods herein.

The mobile device 10 may comprise a collecting unit 601. The processing circuitry 660, the mobile device 10 and/or the collecting unit 601 may be configured to collect, internally and/or externally of the mobile device, information regarding the level of connectivity.

The mobile device 10 may comprise a partitioning unit 602. The processing circuitry 660, the mobile device 10 and/or the partitioning unit 602 may be configured to partition the region into sub-regions based on level of connectivity. The sub-regions may comprise at least the first and the second sub-region. The first sub-region may comprise a single path when the level of connectivity is equal to or above the threshold, and the second sub-region may comprise a more dense map of path possibilities.

The mobile device 10 may comprise an obtaining unit 603. The processing circuitry 660, the mobile device 10 and/or the obtaining unit 603 is configured to obtain from one or more network nodes 11 in the communication network, the first path over the first sub-region of the region towards the destination.

The mobile device 10 may comprise a following unit 604. The processing circuitry 660, the mobile device 10 and/or the following unit 604 is configured to follow the first path.

The mobile device 10 may comprise a switching unit 605. The processing circuitry 660, the mobile device 10 and/or the switching unit 605 is configured to, upon entering or being in the second sub-region of the region having a level of connectivity below the threshold, switch to follow the second path calculated locally at the mobile device 10. The processing circuitry 660, the mobile device 10 and/or the switching unit 605 may be configured to switch from the first path to the second path upon detection of a change of a parameter being associated with describing an environment of the second sub-region. The change may e.g. indicate an obstacle on the first path. The processing circuitry 660, the mobile device 10 and/or the switching unit 605 may be configured to switch to follow a third path over a third sub-region of the region, upon entering or being in a third sub-region having a level of connectivity equal or above the threshold.

The mobile device 10 may comprise a retracing unit 607. The processing circuitry 660, the mobile device 10 and/or the retracing unit 607 may be configured to, upon not being able to calculate the second path with the second sub-region, retrace the mobile device 10 to a last position wherein the level of connectivity is equal to or above the threshold.

The mobile device 10 may comprise a downloading unit 608. The processing circuitry 660, the mobile device 10 and/or the downloading unit 608 may be configured to, upon entering or being in the first sub-region having the level of connectivity above or equal to the threshold, a safe subgraph of a map for the second sub-region. A density of path possibilities of the safe subgraph may be based on capability and/or available capacity of the mobile device 10 and/or the communication network 100.

The mobile device 10 may comprise a requesting unit 609. The processing circuitry 660, the mobile device 10 and/or the requesting unit 609 may be configured to, upon detecting an obstacle in the first sub-region, request an updated first path from the one or more network nodes 11.

The mobile device 10 may comprise a retrieving unit 610. The processing circuitry 660, the mobile device 10 and/or the retrieving unit 610 may be configured to, upon detecting an obstacle in the second sub-region, retrieve the locally calculated second path from a map at the mobile device 10 comprising a number of path possibilities.

The mobile device 10 may comprise a pushing unit 611. The processing circuitry 660, the mobile device 10 and/or the pushing unit 611 may be configured to, upon entering or being in a third sub-region having a level of connectivity above or equal to the threshold, push the locally calculated second path or information related to the calculated second path to a knowledge base.

The embodiments herein may be implemented through a respective processor or one or more processors, such as a processor 660 of the processing circuitry in the mobile device 10 depicted in FIG. 6, together with a respective computer program code for performing the functions and actions of the embodiments herein. The program code mentioned above may also be provided as a computer program product, for instance in the form of a data carrier carrying computer program code for performing the embodiments herein when being loaded into the mobile device 10. One such carrier may be in the form of a universal serial bus (USB) stick, a disc or similar. It is however feasible with other data carriers such as any memory stick. The computer program code may furthermore be provided as pure program code on a server and downloaded to the mobile device 10.

The mobile device 10 may further comprise a memory 670 comprising one or more memory units to store data on. The memory comprises instructions executable by the processor. The memory 670 is arranged to be used to store e.g. paths, thresholds, map of regions, SGs, intents, instructions, configurations and applications to perform the methods herein when being executed in the mobile device 10.

Those skilled in the art will also appreciate that the units in the mobile device 10 mentioned above may refer to a combination of analogue and digital circuits, and/or one or more processors configured with software and/or firmware, e.g. stored in the mobile device 10, that when executed by the respective one or more processors perform the methods described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

In some embodiments, a computer program 690 comprises instructions, which when executed by the respective at least one processor, cause the at least one processor of the mobile device 10 to perform the actions above.

In some embodiments, a carrier 680 comprises the computer program 690, wherein the carrier 680 is one of an electronic signal, an optical signal, an electromagnetic signal, a magnetic signal, an electric signal, a radio signal, a microwave signal, or a computer-readable storage medium.

When using the word "comprise" or "comprising" it shall be interpreted as non-limiting, i.e. meaning "consist at least of".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a mobile device for travelling to a destination using a communication network, the method comprising:

obtaining from one or more network nodes in the communication network, a first path over a first sub-region of a region towards the destination; following the first path;

being in a second sub-region of the region, switching, based on a parameter, to follow a second path, towards the destination, dynamically calculated locally on the mobile device, wherein the second sub-region has a level of connectivity below a threshold, and downloading a sub-graph of a third sub-region of the region at a boundary of the second sub-region, wherein, being in the third sub-region having the level of connectivity above or equal to the threshold, pushing the locally calculated second path or information related to the calculated second path to a knowledge base.

2. The method according to claim 1, further comprising: switching to follow a third path, calculated at the one or more network nodes, over the third sub-region of the region being in the third sub-region having the level of connectivity equal to or above the threshold.

3. The method according to claim 1, wherein the switching from the first path to the second path is performed upon detection of a change of the parameter, the parameter being associated with describing an environment of the second sub-region.

4. The method according to claim 3, wherein the change of the parameter indicates presence of an obstacle on the first path.

5. The method according to claim 1, further comprising: partitioning the region into sub-regions based on the level of connectivity, wherein the sub-regions comprises at least the first and the second sub-region.

6. The method according to claim 1, further comprising: collecting, internally and/or externally of the mobile device, information regarding the level of connectivity.

7. The method according to claim 1, wherein the first sub-region comprises the first path when the level of connectivity is one, and the second sub-region comprises a more dense map of path possibilities when the level of connectivity is zero.

8. The method according to claim 1, wherein upon detecting an obstacle in the first sub-region, the method further comprises requesting an updated first path from the one or more network nodes.

9. The method according to claim 1, wherein upon detecting an obstacle in the second sub-region, the method further comprises retrieving the locally calculated second path from a map at the mobile device comprising a number of path possibilities.

10. The method according to claim 1, wherein upon not being able to calculate the second path with the second sub-region, retracing the mobile device to a last position where the level of connectivity is equal to or above the threshold.

11. The method according to claim 1, wherein, being in the first sub-region having a level of connectivity above or equal to the threshold, downloading the sub-graph of a map for the second sub-region.

12. The method according to claim 11, wherein a density of path possibilities of the sub-graph is based on capability and/or available capacity of the mobile device and/or the communication network, wherein the subgraph is a portion of the map.

13. A mobile device configured to travel to a destination using a communication network, wherein the mobile device is configured to:

obtain from one or more network nodes in the communication network, a first path over a first sub-region of a region, comprising one or more sub-regions, towards the destination; follow the first path;

being in a second sub-region of the region, switch, based on a parameter, to follow a second path, towards the destination, dynamically calculated locally on the mobile device, wherein the second sub-region has a level of connectivity below a threshold; and downloading a sub-graph of a third sub-region at a boundary of the second sub-region, wherein, being in the third sub-region having the level of connectivity above or equal to the threshold, pushing the locally calculated second path or information related to the calculated second path to a knowledge base.

14. The mobile device according to claim 13, wherein the mobile device is further configured to: switch to follow a third path over the third sub-region of the region, being in the third sub-region having the level of connectivity equal to or above the threshold.

15. The mobile device according to claim 13, wherein the mobile device is further configured to switch from the first path to the second path upon detection of a change of the parameter, the parameter being associated with describing an environment of the second sub-region.

16. The mobile device according to claim 15, wherein the change of the parameter indicates presence of an obstacle on the first path.

17. The mobile device according to claim 13, wherein the mobile device is further configured to:

partition the region into sub-regions based on the level of connectivity, wherein the sub-regions comprise at least the first and the second sub-region.

18. The mobile device according to claim 13, wherein the mobile device is further configured to:

collect, internally and/or externally of the mobile device, information regarding the level of connectivity.

19. The mobile device according to claim 13, wherein the first sub-region comprises the first path when the level of connectivity is one, and the second sub-region comprises a more dense map of path possibilities when the level of connectivity is zero.

* * * * *